(12) United States Patent
Yajima et al.

(10) Patent No.: US 9,905,346 B2
(45) Date of Patent: Feb. 27, 2018

(54) MAGNET CHUCK

(71) Applicant: SMC Corporation, Chiyoda-ku (JP)

(72) Inventors: Hisashi Yajima, Tsukuba (JP);
Tsuyoshi Sasaki, Tsukubamirai (JP);
Kouichirou Kanda, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/960,561

(22) Filed: Dec. 7, 2015

(65) Prior Publication Data
US 2016/0189844 A1 Jun. 30, 2016

(30) Foreign Application Priority Data

Dec. 26, 2014 (JP) ................................ 2014-264721
Jun. 10, 2015 (JP) ................................ 2015-117229

(51) Int. Cl.
| | |
|---|---|
| *B66C 1/04* | (2006.01) |
| *H01F 7/02* | (2006.01) |
| *B23Q 3/154* | (2006.01) |
| *B25B 11/00* | (2006.01) |

(52) U.S. Cl.
CPC ......... *H01F 7/0252* (2013.01); *B23Q 3/1546* (2013.01); *B25B 11/002* (2013.01); *B66C 1/04* (2013.01); *H01F 7/0257* (2013.01)

(58) Field of Classification Search
CPC .... H01F 7/0252; H01F 7/0257; H01F 7/0268; H01F 2007/208; B23Q 3/1546; B25B 11/002; E21B 31/06; B66C 1/04
USPC ...... 335/285–288, 295; 294/65.5, 190; 269/8
See application file for complete search history.

(56) References Cited

U.S. PATENT DOCUMENTS

| | | | | |
|---|---|---|---|---|
| 6,015,175 A | * | 1/2000 | Carruth ................ | B23Q 3/15 294/192 |
| 6,086,125 A | * | 7/2000 | Kovacs ................ | B23Q 3/15 294/192 |
| 6,538,544 B1 | * | 3/2003 | Hardy ................ | B66C 1/04 294/192 |

FOREIGN PATENT DOCUMENTS

| | | |
|---|---|---|
| JP | 51-102174 | 8/1976 |
| JP | 55-78505 | 6/1980 |

* cited by examiner

*Primary Examiner* — Ramon M Barrera
(74) *Attorney, Agent, or Firm* — Oblon, McClelland, Maier & Neustadt, L.L.P.

(57) ABSTRACT

A magnet chuck includes, for example, four permanent magnets of a first permanent magnet through a fourth permanent magnet, serving as an attracting and retaining member for attracting and retaining a workpiece. In the first permanent magnet and the third permanent magnet, the magnetic polarity of a workpiece magnetic attracting surface facing the workpiece is of an N-polarity. On the other hand, in the second permanent magnet and the fourth permanent magnet, the magnetic polarity of a workpiece magnetic attracting surface is of an S-polarity. More specifically, in this case, combinations of the N-pole and the S-pole on the workpiece magnet attracting surface are formed in two pairs, and the N-pole and the S-pole, which are of different polarities, are adjacent to one another.

13 Claims, 19 Drawing Sheets

D1<D2<D3

MAGNET CHUCK

CROSS-REFERENCE TO RELATED APPLICATIONS

This application is based upon and claims the benefit of priority from Japanese Patent Applications No. 2014-264721 filed on Dec. 26, 2014 and No. 2015-117229 filed on Jun. 10, 2015, the contents all of which are incorporated herein by reference.

BACKGROUND OF THE INVENTION

Field of the Invention

The present invention relates to a magnet chuck that attracts and retains a workpiece by the magnetic force of a permanent magnet.

Description of the Related Art

A magnet chuck includes either one of an electromagnet or a permanent magnet. In the case of an electromagnet, a magnetic force is generated by starting supply of current (i.e., energizing) to the electromagnet, and the workpiece is attracted and retained by the magnetic force. Further, when supply of current is stopped, the magnetic force disappears, and as a result, the workpiece is released.

On the other hand, in the case of a permanent magnet, for example, as disclosed in Japanese Laid-Open Patent Publication No. 55-078505, an arrangement exists for attraction and retention as well as releasing of the workpiece to be switched by rotating the permanent magnet. However, more generally, an arrangement is known in which the permanent magnet is connected to a piston, and the permanent magnet is displaced together with the piston (for example, see Japanese Laid-Open Utility Model Publication No. 51-102174). With the magnet chuck disclosed in Japanese Laid-Open Utility Model Publication No. 51-102174, following along with the displacement of a piston that has received a pressure fluid, a permanent magnet is brought into close proximity to a workpiece, then the workpiece being attracted and retained thereby. Further, when the permanent magnet and the piston are displaced in a direction to separate away from the workpiece, the workpiece is released.

This type of magnetic chuck, for example, is disposed on a distal end arm of a robot, and accompanying the robot performing a predetermined operation, the attracted and retained workpiece is transported to a predetermined position.

SUMMARY OF THE INVENTION

When a workpiece having a large weight is attracted, it is considered that, as for the permanent magnet, one having a large magnetic force should be selected. In this case, it can be expected that a large attracting force will be produced. However, in particular, in the case that the workpiece is a thin plate, since magnetic saturation occurs in the interior of the workpiece, it is not easy for such a large attracting force to be produced.

A principal object of the present invention is to provide a magnet chuck that expresses a large attracting force with respect to a workpiece.

According to an embodiment of the present invention, a magnet chuck is provided that attracts and retains a workpiece with a workpiece magnetic attracting surface that faces toward the workpiece, by magnetic forces of a plurality of permanent magnets, the magnet chuck including a piston accommodated inside a cylinder tube. The plurality of permanent magnets are configured to be displaced in a same direction as a direction of displacement of the piston, in following relation to the piston receiving a pressing force from a pressure fluid and being displaced thereby, and the plurality of permanent magnets are arranged to cause a combination of an N-pole and an S-pole to exist in one or more pairs, on the workpiece magnetic attracting surface.

The permanent magnet may be one individual magnet. More specifically, according to another embodiment of the present invention, a magnet chuck is provided that attracts and retains a workpiece with a workpiece magnetic attracting surface that faces toward the workpiece, by a magnetic force of one permanent magnet, the magnet chuck including a piston accommodated inside a cylinder tube. The permanent magnet is configured to be displaced in a same direction as a direction of displacement of the piston, in following relation to the piston receiving a pressing force from a pressure fluid and being displaced thereby, and the permanent magnet is configured to be magnetized to cause a combination of an N-pole and an S-pole to exist in one or more pairs, on the workpiece magnetic attracting surface.

In the respective configurations described above, a magnetic flux that is generated from the exposed N-pole on the workpiece magnetic attracting surface is directed toward the exposed S-pole on the same workpiece magnetic attracting surface. Therefore, compared to a situation in which the magnetic polarity of the workpiece magnetic attracting surface is either one of an N-pole or an S-pole, i.e., compared with the magnet chuck according to the conventional art having one pole, the magnetic path (amount of magnetic flux) within the workpiece can be made greater. More specifically, although the present invention is the same as the conventional art concerning the point of magnetic saturation occurring inside the workpiece, the magnetic flux that passes through the workpiece is remarkably increased in comparison with the conventional technique. As a result, a large attractive force with respect to the workpiece is expressed. Such a feature is particularly prominent when the different magnetic poles (N-pole and S-pole) are arranged adjacently.

From the fact that the attractive force is made greater in the foregoing manner, even in the case that the workpiece is a thin-walled member (e.g., a thin steel plate) and that it is easy for magnetic saturation to occur in the interior thereof, the workpiece can effectively be attracted magnetically and sufficiently retained. Stated otherwise, the present invention is particularly effective when the thickness of the workpiece is small.

As understood from the above, with the present invention, assuming that the materials and characteristics of the permanent magnets are the same as those of the permanent magnets of the magnet chuck according to the conventional art, when the dimensions thereof are the same, the attractive force with respect to the workpiece can be increased. On the other hand, since the dimensions of the permanent magnets can be made smaller in the case that the attractive force is the same as that of the permanent magnets according to the conventional art, the magnet chuck can be reduced in scale (made compact).

In the case that a plurality of individual permanent magnets are used, as such permanent magnets, there can be adopted permanent magnets which are magnetized in a direction perpendicular with respect to the workpiece magnetic attracting surface. In this case, with the permanent magnets, the magnetic polarities thereof differ on the workpiece magnetic attracting surface (the surface facing the workpiece) and the rear surface thereto. Consequently, by using a plurality of individual permanent magnets, one or more pairs of an N-pole and an S-pole can be formed on the workpiece magnetic attracting surface.

In addition, with this configuration, a magnetic flux that is generated from the exposed N-pole on the workpiece magnetic attracting surface is directed both toward the exposed S-pole on the workpiece magnetic attracting surface, and an exposed S-pole on the rear surface of the workpiece magnetic attracting surface. More specifically, the magnetic path (amount of magnetic flux) can be further increased. Coupled therewith, the attractive force can be further enhanced.

In the above-described configuration, it is sufficient if the N-pole and the S-pole reside as one pole each (stated otherwise, the combination of the N-pole and the S-pole is one pair) on the workpiece magnetic attracting surface. However, when the N-pole and the S-pole reside as two poles each (stated otherwise, the combinations of the N-pole and the S-pole are two pairs), the attracting force becomes greater and therefore is preferred.

The permanent magnets of the above configuration may be supported on the piston through a yoke. In this case, owing to the presence of the yoke, the attractive force is made more powerful. Consequently, the workpiece can be attracted and retained more effectively.

As the permanent magnets, at least three individual permanent magnets, which are disposed in a Halbach array, may be used. More specifically, the Halbach array is formed by two permanent magnets, which are magnetized in a direction perpendicular to the workpiece magnetic attractive surface, and at least one permanent magnet, which is magnetized in a direction parallel to the workpiece magnetic attracting surface, being disposed between the two permanent magnets. In addition, an N-pole of one from among the two permanent magnets that are magnetized in a direction perpendicular to the workpiece magnetic attracting surface, and an S-pole of the remaining one of the two permanent magnets may be exposed on the workpiece magnetic attracting surface.

Each of the plurality of permanent magnets may be a U-shaped magnet. In such a U-shaped magnet, one of the two distal ends is an N-pole, and the other of the two distal ends is an S-pole. Consequently, by placing both poles of the respective U-shaped magnets to face toward the workpiece, two pairs or more of the N-pole and the S-pole are exposed on the workpiece magnetic attracting surface.

On the other hand, in the case that the number of the permanent magnets is a single individual magnet, then as the permanent magnet, for example, one that is magnetized in a U-shape may be used. In this case, both the N-pole and the S-pole are exposed on the workpiece magnetic attracting surface. Such a permanent magnet can be manufactured by bringing a U-shaped magnet in close proximity to one end surface, and carrying out magnetization therewith.

Alternatively, the permanent magnet may be magnetized in a direction perpendicular with respect to the workpiece magnetic attracting surface. More specifically, both the N-pole and the S-pole are exposed on the workpiece magnetic attracting surface, and on the rear surface thereof as well, both the N-pole and the S-pole are exposed. Such a permanent magnet can be manufactured by bringing one U-shaped magnet in close proximity to one end surface, bringing another U-shaped magnet in close proximity to the rear surface thereof, and carrying out magnetization therewith.

In the above described configuration, when the permanent magnet is rotated, the magnetic flux density in the vicinity of an auto switch changes, and as a result, there is thought to be a possibility that a mistaken operation of the auto switch may be caused. Thus, in the cylinder tube, a rotation prevention member preferably is provided for preventing rotation of the permanent magnet. Due to this feature, the concern that the aforementioned situation will be caused can be dispensed with.

When the rotation prevention member is provided, the rotation prevention member preferably is made from a ferromagnetic metal, and is disposed at a boundary between the N-pole and the S-pole adjacent to each other on the workpiece magnetic attracting surface. With this arrangement, rather than disposing the rotation prevention member at another position, it becomes most difficult for the permanent magnet to be rotated.

The rotation prevention member preferably is a connecting member for connecting the cylinder tube and a head cover. In this case, since the connecting member used for assembling the magnet chuck act as the rotation prevention member, it is unnecessary to use a separate rotation prevention member other than the connecting member. Accordingly, since an increase in the number of parts is avoided, it is possible for the magnet chuck to be made more compact in size. Such a configuration is also cost effective.

Further, a seal member preferably is disposed on a side wall of the piston, and a site between the piston and the cylinder tube may be sealed by the seal member. In this case, at either of times when the permanent magnet is advanced or retracted, the piston receives a pressing force from the pressure fluid. The pressure receiving area of the piston when the permanent magnet is advanced, and the pressure receiving area of the piston when the permanent magnet is retracted are roughly equal, and therefore, the thrust forces during advancement and retraction are substantially equivalent. Consequently, for example, response speeds when the workpiece is magnetically attracted and when the workpiece is released can be made substantially equivalent.

A magnet cover may be provided, which is attached to the cylinder tube and covers the permanent magnet, and a buffering member, which carries out a buffering action when the permanent magnet attracts the workpiece, may be mounted detachably on the magnet cover. With such a configuration, the buffering member is brought into contact with and interferes with the workpiece when the permanent magnet attracts the workpiece. Consequently, stresses that act on the magnet chuck are alleviated. More specifically, the buffering member carries out a buffering action. Therefore, vibrations of the magnet chuck can be suppressed.

Simultaneously, the buffering member functions as a slip preventing device. More specifically, frictional resistance occurs between the buffering member and the magnetically attracted workpiece. Therefore, since it is difficult for the workpiece to undergo sliding movement with respect to the buffering member, separation or falling off of the workpiece from the magnet chuck is effectively prevented.

In such a configuration, preferably, a plurality of buffering members are provided, and projecting thicknesses of the buffering members from the magnet cover differ mutually from each other. In this case, an attracting force with respect to the workpiece can be altered by exchanging the buffering member. The region at which the buffering member projects from the magnet cover interferes with the workpiece. Accordingly, as the projecting thickness of the buffering member from the magnet cover becomes greater, the distance between the permanent magnet and the workpiece also is increased. As a result, it becomes more difficult for the influence of the magnetic force from the permanent magnet to act on the workpiece.

The above and other objects, features and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a magnet chuck according to the present invention will be described in detail below with reference to the accompanying drawings. In the following description, the terms "up" and "down" correspond to the up and down directions in FIGS. 1, 3, and 4. Further, in the present embodiment, a case is exemplified in which compressed air is used as a working fluid.

Figure 1:
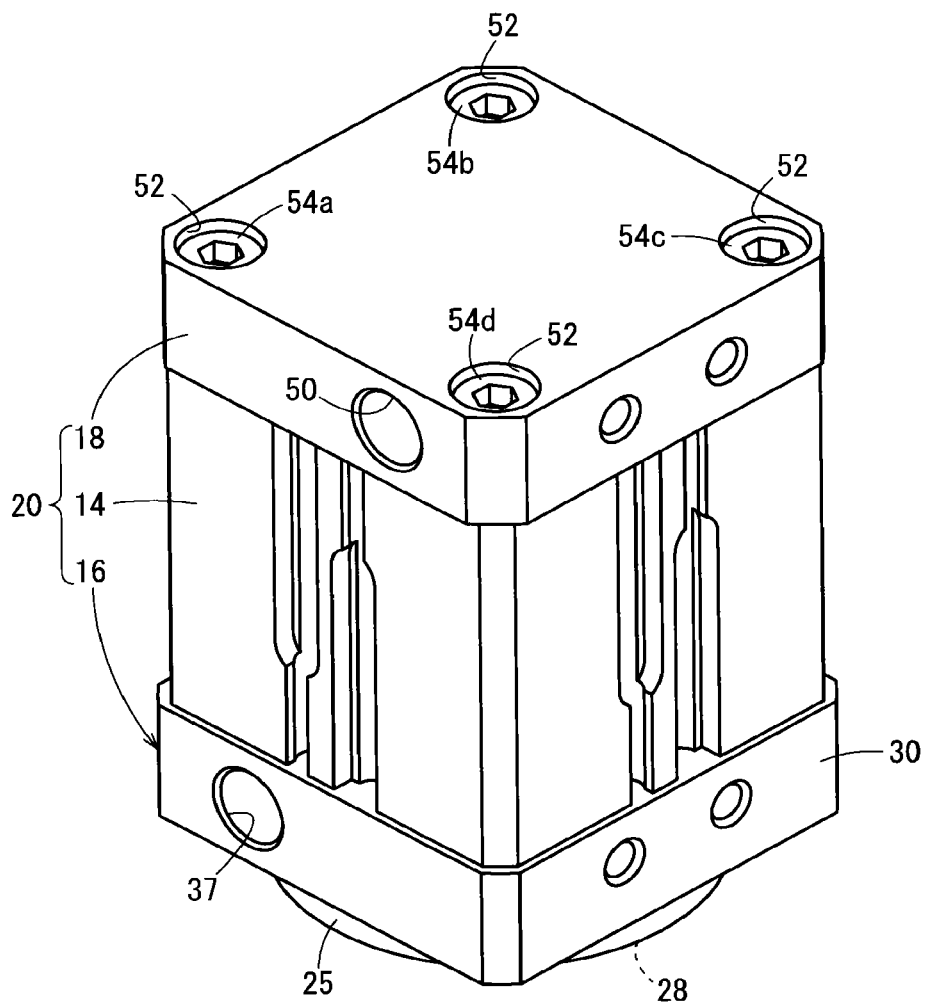
FIG. 1 is an outline perspective view of essential components of a magnet chuck according to an embodiment of the present invention.
Figure 2:
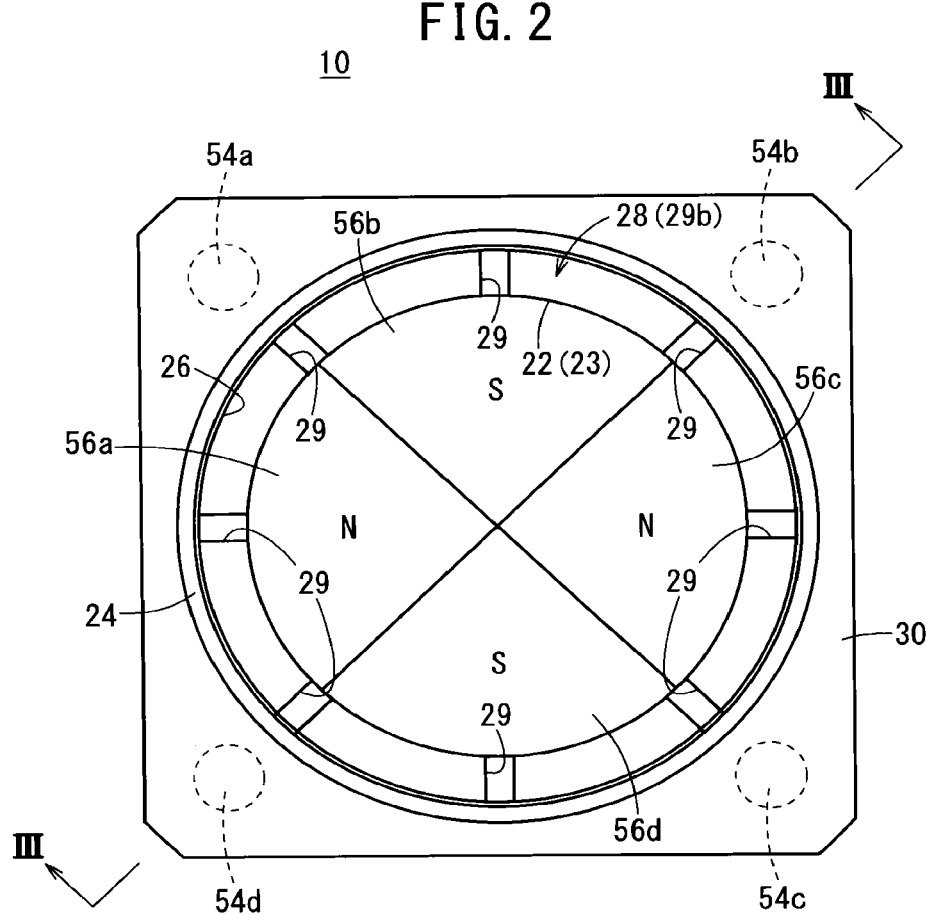
FIG. 2 is a plan view as seen from the direction of the arrow A in FIG. 1.
Figure 3:
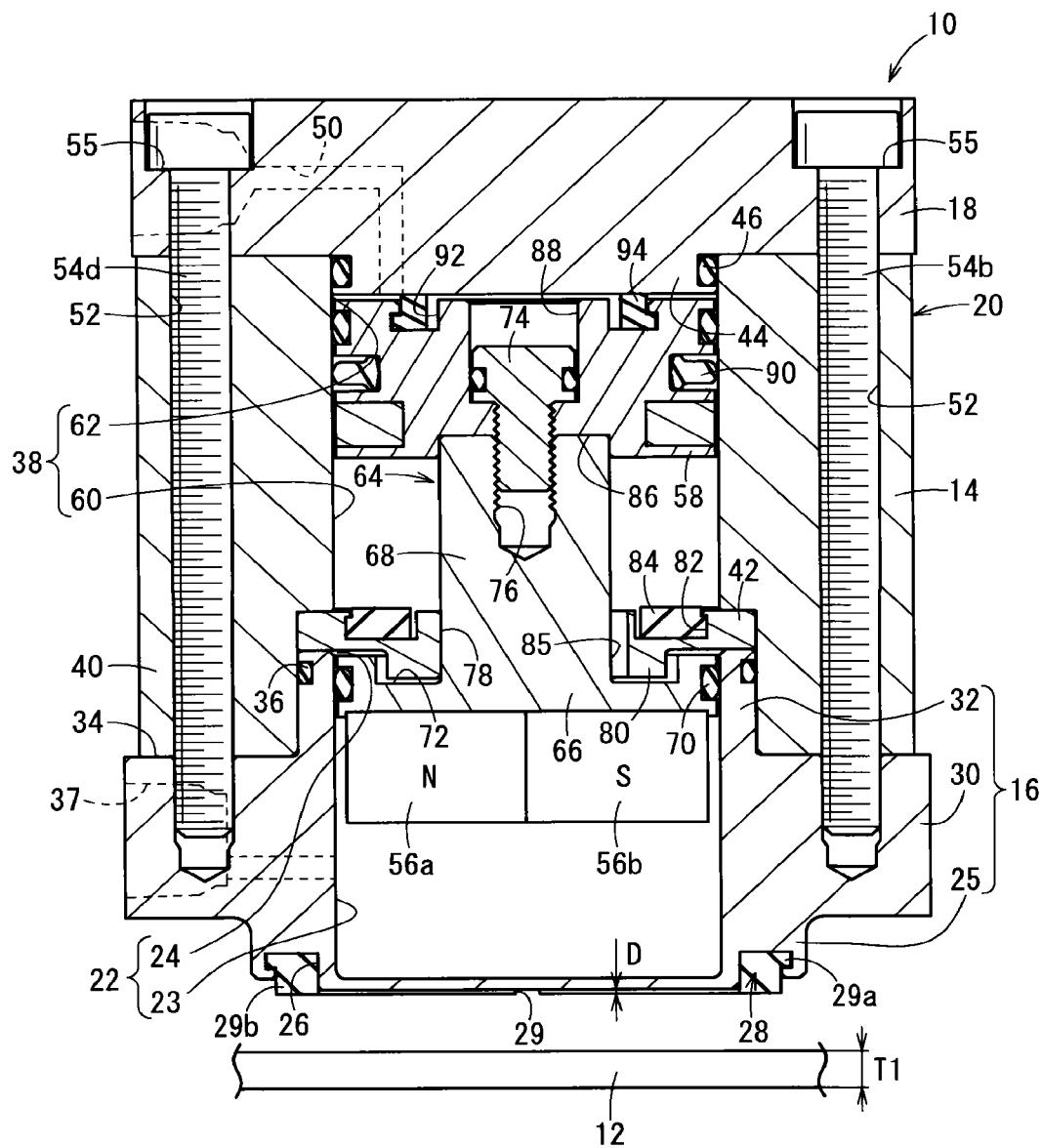
FIG. 3 is a cross-sectional view taken along line III-III of FIG. 2.
Figure 4:
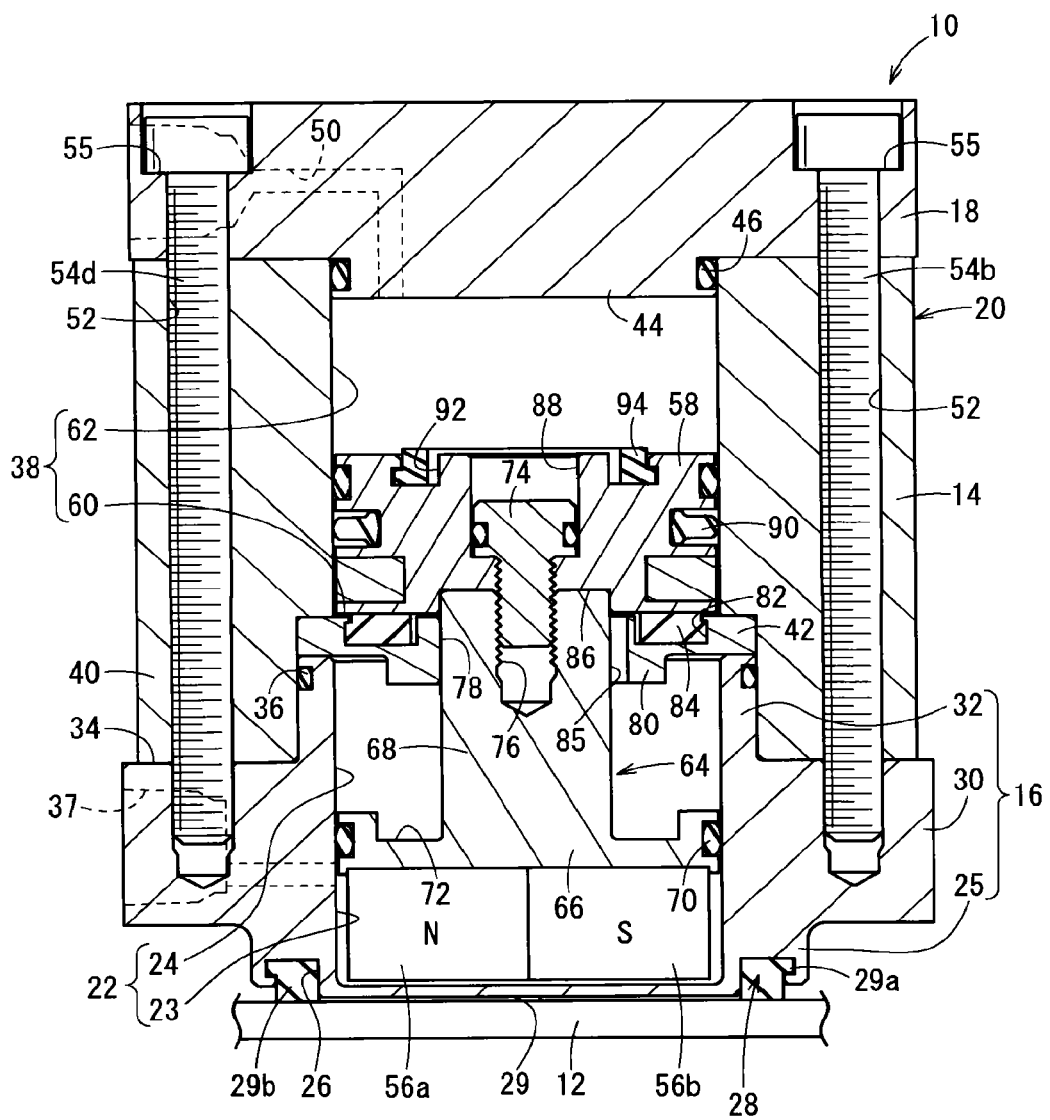
FIG. 4 is an outline vertical cross-sectional view showing a condition in which a piston, a yoke, and first through fourth permanent magnets are displaced downwardly from the state shown in FIG. 3.

FIGS. 1 through 3 are, respectively, an outline perspective view of essential components of a magnet chuck 10 according to an embodiment of the present invention, a plan view as seen from the direction of the arrow A in FIG. 1, and a cross-sectional view taken along line III-III of FIG. 2. The magnet chuck 10 attracts and retains a workpiece 12 shown in FIG. 3. Of course, the workpiece 12 is constituted from a ferromagnetic material, and as a detailed example thereof, a thin steel plate may be cited. A thickness T1 of the workpiece 12 is on the order of 0.5 to 2 mm, for example, and typically is about 0.6 mm.

The magnet chuck 10 includes a housing 20 constituted by attaching a magnet cover 16, and a head cover 18 with respect to a cylinder tube 14. Below, with reference primarily to FIG. 3, initially, the magnet cover 16 is made up from a hollow body in which a first sliding hole 22 is formed to extend along a longitudinal direction thereof. In the first sliding hole 22, a lower chamber 23 and a first intermediate chamber 24 are defined by a flange 66 (retaining member) of a later-described yoke 64, and a plate member 42 (partitioning member). More specifically, the lower chamber 23 is a space between a bottom wall of the magnet cover 16 and a lower end surface of the flange 66. Further, the first intermediate chamber 24 is a space between an upper end surface of the flange 66 and a lower end surface of the plate member 42.

A hollow cylindrical column 25 is formed to project on the lower end surface of the magnet cover 16, and in the hollow cylindrical column 25, a first annular groove 26 is formed that surrounds the first sliding hole 22 (lower chamber 23). In the first annular groove 26, a buffering member 28 is constituted, and a flange 29a thereof is inserted, which is slightly greater in diameter, and projects in a diametrically outward direction. After the flange 29a has been accommodated in the first annular groove 26, by returning to its original shape by an elastic action thereof, falling out of the flange 29a from the first annular groove 26 is prevented. As a result, dropping off of the buffering member 28 from the magnet cover 16 is prevented.

By elastically deforming the buffering member 28, the flange 29a can easily be inserted into and separated from the first annular groove 26. Stated otherwise, the buffering member 28 is mounted in a detachable manner with respect to the magnet cover 16.

A cylindrical portion 29b of the buffering member 28, which is smaller in diameter than the flange 29a, covers the hollow cylindrical column 25. Furthermore, one end of the cylindrical portion 29b projects in a ring shape from the hollow cylindrical column 25 (magnet cover 16). Further, a plurality of individual slits 29 (see FIG. 2) are formed in the buffering member 28.

The buffering member 28, which is constituted in the foregoing manner, preferably is made from a suitably oil resistant material. As examples of such a preferred material, there may be cited fluoro rubber, silicone rubber, chloroprene rubber, nitrile rubber, acrylic rubber, or the like. The material of the buffering member 28 may also be a resin.

A plurality of the buffering members 28 preferably are prepared. In this case, as such plural individual buffering members 28, there may be selected those in which the projecting amounts D of the cylindrical portions 29b from the hollow cylindrical column 25 differ mutually from each other. This point will be discussed in more detail later.

A middle flank portion 30 (see FIG. 3) of the magnet cover 16 is shaped substantially in the form of a rectangular parallelepiped, and an upper end portion 32 thereof is formed in a substantially cylindrical shape. Based on such different shapes, a stepped part 34 is formed by the middle flank portion 30 and the upper end portion 32 on the magnet cover 16. A first seal member 36 is disposed on a side wall of the upper end portion 32.

Further, a first port 37 is formed in one side surface of the middle flank portion 30. The first port 37 communicates with the lower chamber 23.

A second sliding hole 38 that extends along the longitudinal direction thereof is formed in the cylinder tube 14. A cross section of the second sliding hole 38 perpendicular to the longitudinal direction is substantially-perfectly circular. Further, the second sliding hole 38 opens on an upper end and a lower end of the cylinder tube 14. More specifically, the cylinder tube 14 is a hollow body the exterior of which is shaped substantially in the form of a rectangular parallelepiped.

In the vicinity of the lower end side opening of the second sliding hole 38, a thin-walled portion 40 is formed by the inner wall thereof being recessed toward the side of the outer wall. Thus, the thickness of the thin-walled portion 40 is set to be smaller in comparison with other regions. A lower end surface of the thin-walled portion 40 abuts against the stepped part 34 of the magnet cover 16. Further, the upper end portion 32 of the magnet cover 16 is inserted through the second sliding hole 38 together with being fitted into the thin-walled portion 40. A site between the thin-walled portion 40 and the upper end portion 32 of the magnet cover 16 is sealed by the first seal member 36.

An outer edge of the plate member 42 is sandwiched between an upper end surface of the magnet cover 16 and a ceiling surface of the thin-walled portion 40. Stated otherwise, the plate member 42 is gripped by the magnet cover 16 and the cylinder tube 14. Details concerning the plate member 42 will be discussed later.

The opening on the upper end side of the cylinder tube 14 is closed by the head cover 18. An entry member 44 shaped in the form of a substantially cylindrical column, is formed to project on the lower end surface of the head cover 18. By entry of the entry member 44 into the interior of the cylinder tube 14, the head cover 18 is fitted into the cylinder tube 14. A second seal member 46 is disposed on a side wall of the entry member 44, such that a site between the cylinder tube 14 and the head cover 18 is sealed by the second seal member 46.

A second port 50 is formed in one side surface of the head cover 18. The second port 50 is positioned on the same side surface on which the first port 37 is formed. A non-illustrated supply and exhaust mechanism is connected to the first port 37 and the second port 50.

In the four corners of the housing 20, bottomed rod holes 52 are formed, respectively, which extend from the head cover 18, through the cylinder tube 14, and to the vicinity of the lower end of the middle flank portion 30 of the magnet cover 16. Threaded parts of first through fourth tie rods 54a to 54d (connecting members), which are inserted through the respective rod holes 52, are screw-engaged with threaded portions engraved in the vicinity of bottom parts of the rod holes 52. Further, head parts thereof are stopped in annular stepped parts 55 that are disposed in the head cover 18. Accompanying screw-engagement of the first through fourth tie rods 54a to 54d, the head cover 18, the cylinder tube 14, and the magnet cover 16 are fastened together and connected, thereby forming the housing 20.

In the structure described above, the head cover 18, the cylinder tube 14, and the magnet cover 16, for example, are constituted from a paramagnetic metal such as an aluminum alloy or the like. On the other hand, the first through fourth tie rods 54a to 54d are constituted from a ferromagnetic metal such as cast iron (e.g., a material corresponding to SS400 as regulated by the Japan Industrial Standard), and as will be discussed later, function as rotation preventing members, i.e., so-called rotation stops, that prevent first through fourth permanent magnets 56a to 56d, which serve as an attracting and retaining member, from rotating.

In the interior of the housing 20, the first sliding hole 22 and the second sliding hole 38 are partitioned by the plate member 42. Furthermore, the second sliding hole 38 is partitioned into a second intermediate chamber 60 and an upper chamber 62 by a piston 58 and the head cover 18.

On the other hand, the upper chamber 62 is formed between the piston 58 and the entry member 44 of the head cover 18. The second port 50 communicates with the upper chamber 62.

The magnet chuck 10 includes the first through fourth permanent magnets 56a through 56d for the purpose of attracting and retaining the workpiece 12 (see FIG. 3). Each of the first through fourth permanent magnets 56a through 56d is held in the yoke 64 through its own magnetic force or through a connecting member such as a retaining bolt or the like.

As shown in FIG. 2, the first through fourth permanent magnets 56a through 56d, respectively, are substantially fan shaped with a central angle thereof being substantially 90° as viewed in plan. By circular arrangement of such a columnar body, overall, a permanent magnet of a cylindrical columnar shape is constructed. More specifically, the first permanent magnet 56a is in contact with the second permanent magnet 56b and the fourth permanent magnet 56d, which lie adjacent to the first permanent magnet 56a, and is disposed in facing relation to the third permanent magnet 56c.

The radii of the first through fourth permanent magnets 56a through 56d may be set to a value on the order of 10 to 30 mm, for example. A typical example for the radii is roughly 15 mm, and in this case, the diameter of the permanent magnets as a whole is roughly 30 mm. Further, a typical example for the height (distance from a lower end surface to an upper end surface) of the first through fourth permanent magnets 56a through 56d is roughly 10 mm.

For ease of understanding, in FIG. 2, the bottom wall portion of the magnet cover 16 is omitted from illustration.

However, in actuality, the first through fourth permanent magnets 56a through 56d are covered by the bottom wall portion of the magnet cover 16 (see FIG. 3).

When the first through fourth permanent magnets 56a through 56d are displaced to approach toward the workpiece 12 in unison together with the yoke 64 and the piston 58, the workpiece 12 shown in FIG. 3 is attracted. More specifically, in the first through fourth permanent magnets 56a through 56d, a facing surface thereof that faces toward the workpiece 12 serves as a workpiece magnetic attracting surface (attracting and retaining surface).

The magnetic polarity of both the workpiece magnetic attracting surfaces of the first permanent magnet 56a and the third permanent magnet 56c is of an N-polarity. In contrast thereto, the magnetic polarity of both the workpiece magnetic attracting surfaces of the second permanent magnet 56b and the fourth permanent magnet 56d is of an S-polarity. Consequently, the polarities of the workpiece magnetic attracting surfaces, in a clockwise direction, form an N-pole (first permanent magnet 56a), an S-pole (second permanent magnet 56b), an N-pole (third permanent magnet 56c), and an S-pole (fourth permanent magnet 56d). More specifically, in this case, combinations of the N-pole and the S-pole on the workpiece magnet attracting surface are formed in two pairs, and the magnetic pole faces thereof are exposed so that the N-pole and the S-pole, which are of different polarities, are adjacent to one another.

On the side of the retained surfaces, which are retained by the yoke 64, conversely to the above, in the clockwise direction, an S-pole (first permanent magnet 56a), an N-pole (second permanent magnet 56b), an S-pole (third permanent magnet 56c), and an N-pole (fourth permanent magnet 56d) are arrayed alongside one another in this order.

The first tie rod 54a is positioned on an outer circumferential side of a boundary between the first permanent magnet 56a and the second permanent magnet 56b, or stated otherwise, on an outer circumferential side of a boundary between the N-pole (first permanent magnet 56a) and the S-pole (second permanent magnet 56b) on the workpiece magnetic attracting surface. In the same manner, the second tie rod 54b, the third tie rod 54c, and the fourth tie rod 54d are positioned respectively on outer circumferential sides of a boundary between the second permanent magnet 56b and the third permanent magnet 56c, on an outer circumferential side of a boundary between the third permanent magnet 56c and the fourth permanent magnet 56d, and on an outer circumferential side of a boundary between the fourth permanent magnet 56d and the first permanent magnet 56a. Ultimately, the first through fourth tie rods 54a through 54d are disposed at boundaries between adjacent magnetic poles on the workpiece magnetic attracting surface.

Because the first through fourth tie rods 54a through 54d are made from a ferromagnetic metal, the magnetic forces from the first through fourth permanent magnets 56a through 56d also are exerted on the first through fourth tie rods 54a through 54d. More specifically, attracting forces are generated between the first through fourth permanent magnets 56a through 56d and the first through fourth tie rods 54a through 54d.

Since, as described above, mutual attracting forces occur between the first through fourth permanent magnets 56a through 56d and the first through fourth tie rods 54a through 54d, the first through fourth permanent magnets 56a through 56d are prevented from undergoing rotation. Ultimately, the first through fourth permanent magnets 56a through 56d act to stop rotation of the piston 58 and the yoke 64. In this manner, by the first through fourth tie rods 54a through 54d, which serve to form the housing 20, the rotational torque of the first through fourth permanent magnets 56a through 56d can be made substantially zero.

When the first through fourth tie rods 54a through 54d are positioned as described above, the rotational torque generated in the first through fourth permanent magnets 56a through 56d is reduced to a minimum. Stated otherwise, stopping of rotation can be implemented more effectively.

As described above, the first through fourth permanent magnets 56a through 56d are retained in the yoke 64 (see FIG. 3). More specifically, the yoke 64 includes the large diameter flange 66 and a small diameter shaft 68. The first through fourth permanent magnets 56a through 56d are retained on the flange 66 by a magnetic force of itself, or by connecting members such as bolts or the like. The flange 66 and the shaft 68 are formed integrally in the yoke 64 (from the same member). Moreover, since the yoke 64 is made from a ferromagnetic metal such as cast iron (a material corresponding to SS400), it becomes possible for the first through fourth permanent magnets 56a through 56d to be magnetically attracted to the flange 66.

The thickness of the flange 66 is set, for example, on the order of 10 mm. The flange 66 functions as a backup yoke. Further, a wear ring 70 is disposed on a side wall of the flange 66. By action of the wear ring 70, the occurrence of shifting or slippage of the center of the flange 66 with respect to the center of the first sliding hole 22 is avoided, and the flange 66, and by extension the yoke 64, are guided along the interior of the first sliding hole 22.

On the other hand, an annular recess 72, which is recessed toward the side of the lower end surface, is formed on the upper end surface of the flange 66. Further, a bolt hole 76 for screw-engagement therein of a connecting bolt 74 is formed on the upper end of the shaft 68.

The plate member 42 is arranged between the piston 58 and the first through fourth permanent magnets 56a through 56d (the flange 66 of the yoke 64). For this purpose, an insertion hole 78 is formed in a penetrating manner substantially in the center of the plate member 42, in order to allow the shaft 68 of the yoke 64 to pass therethrough. Of course, the inner diameter of the insertion hole 78 is smaller than the outer diameter of the piston 58.

Further, on a lower end surface of the plate member 42, a disk-shaped projection 80 is formed to project toward the flange 66. When the piston 58, the yoke 64, and the first through fourth permanent magnets 56a through 56d are positioned at a top dead center point (see FIG. 3), which is a displacement end point, the disk-shaped projection 80 enters into the annular recess 72 that is formed in the flange 66 of the yoke 64.

A wide second annular groove 82 is formed in an upper end surface of the plate member 42. A ring-shaped first damper 84 is accommodated in the second annular groove 82. A lower end surface of the piston 58, upon reaching the bottom dead center point, which is another displacement end point, abuts against the first damper 84 (see FIG. 4).

Furthermore, on the plate member 42, in the vicinity of the insertion hole 78, a communication groove 85 is formed for enabling communication between the first intermediate chamber 24 and the second intermediate chamber 60. By the communication groove 85, it is possible for compressed air inside the first intermediate chamber 24 to move into the second intermediate chamber 60, or for compressed air inside the second intermediate chamber 60 to move into the first intermediate chamber 24.

An upper end surface of the shaft 68 that has been inserted through the insertion hole 78 of the plate member 42 is inserted into an insertion hole 86 that is formed in a lower end surface of the piston 58. A bolt stopping hole 88 is formed in the piston 58 from the upper end surface side thereof to the insertion hole 86, and the connecting bolt 74, which is stopped in the bolt stopping hole 88, is screw-engaged with the bolt hole 76. Owing to this feature, the piston 58 and the yoke 64 are connected together mutually, and the first through fourth permanent magnets 56a through 56d are retained indirectly on the piston 58 through the yoke 64.

A third seal member 90 is disposed on a side wall of the piston 58. A site between the piston 58 and the cylinder tube 14 is sealed by the third seal member 90. More specifically, compressed air inside the upper chamber 62 is prevented from leaking into the second intermediate chamber 60 from between the side wall of the piston 58 and an inner wall of the second sliding hole 38 of the cylinder tube 14. For the same reason, air inside the second intermediate chamber 60 is prevented from leaking into the upper chamber 62.

A wide third annular groove 92 is formed on an upper end surface of the piston 58. A ring-shaped second damper 94 is accommodated in the third annular groove 92. When the piston 58 reaches a top dead center point, the second damper 94 abuts against the lower end surface of the entry member 44 of the head cover 18 (see FIG. 3).

The magnet chuck 10 according to the present embodiment is constructed basically in the manner described above. Next, actions and advantageous effects thereof will be described in relation to operations of the magnet chuck 10.

The magnet chuck 10, for example, is disposed on a distal end arm of a non-illustrated robot. In addition, by the robot implementing predetermined operations, as shown in FIG. 3, the workpiece magnetic attracting surfaces of the first through fourth permanent magnets 56a through 56d are brought into facing relation to the workpiece 12. At this time, the piston 58, the yoke 64, and the first through fourth permanent magnets 56a through 56d are positioned at a top dead center point, and accordingly, at this point in time, the magnetic forces of the first through fourth permanent magnets 56a through 56d are not exerted on the workpiece 12.

Next, pressurized air is supplied from the supply and exhaust mechanism through the second port 50 to the upper chamber 62. The pressurized air presses the piston 58 from the upper end surface side thereof. Simultaneously, under the action of the supply and exhaust mechanism, pressurized air is exhausted from the lower chamber 23 through the first port 37. The pressurized air inside the second intermediate chamber 60 moves into the first intermediate chamber 24 through the communication groove 85, and further, the pressurized air inside the first intermediate chamber 24 passes between the side wall of the flange 66 and the inner wall of the first sliding hole 22, and moves into the lower chamber 23. Thereafter, the aforementioned pressurized air is exhausted as well through the first port 37.

The piston 58, which has received pressing from the compressed air inside the upper chamber 62, is displaced (descends) in a direction to approach the plate member 42. Since the lower chamber 23, the first intermediate chamber 24, and the second intermediate chamber 60 are under a negative pressure, the piston 58 is displaced easily.

Simultaneously with the descending of the piston 58, the yoke 64 that is connected to the piston 58, and the first through fourth permanent magnets 56a through 56d that are connected to the yoke 64 also descend, and as a result, the first through fourth permanent magnets 56a through 56d approach toward the workpiece 12. Ultimately, the piston 58, the yoke 64, and the first through fourth permanent magnets 56a through 56d reach a bottom dead center point, thus resulting in the condition shown in FIG. 4.

When the piston 58 reaches the bottom dead center point, the piston 58 comes into abutment with the first damper 84 provided on the plate member 42. Vibrations or collisions that occur at the time of abutment are buffered by the first damper 84, and therefore, vibrating of the magnet chuck 10 can sufficiently be suppressed. Further, since damage to the piston 58 or the plate member 42 is avoided, durability of the magnet chuck 10 can be improved.

When the first through fourth permanent magnets 56a through 56d reach the bottom dead center point, since the respective workpiece magnetic attracting surfaces thereof come into sufficient proximity with respect to the workpiece 12, the magnetic forces thereof are exerted on the workpiece 12. More specifically, the workpiece 12 is attracted by the magnetic forces of the first through fourth permanent magnets 56a through 56d, and through the bottom wall portion of the magnet cover 16, the workpiece 12 is attracted to and retained by the first through fourth permanent magnets 56a through 56d. Further, because the flange 66 of the yoke 64 functions as a backup yoke, the workpiece 12 is attracted and retained more suitably.

Since the magnet cover 16 is made from a paramagnetic metal, the magnet cover 16 cannot function as a yoke. More specifically, the yoke does not intervene between the first through fourth permanent magnets 56a through 56d and the workpiece 12. Therefore, exertion of an influence on formation of the magnetic path between the first through fourth permanent magnets 56a through 56d and the workpiece 12 is avoided.

Moreover, since the buffering member 28 is provided on the lower end surface of the magnet cover 16, when the workpiece 12 is magnetically attracted to the bottom wall of the magnet cover 16, the buffering member 28 interferes with the abutment of the workpiece 12. Due to such interference, stresses that act on the magnet cover 16, and by extension the magnet chuck 10, are alleviated. More specifically, the buffering member 28 carries out a buffering action. Consequently, vibrating of the magnet chuck 10 can sufficiently be suppressed, together with avoiding damage to the magnet cover 16 or the first through fourth permanent magnets 56a through 56d.

Frictional resistance occurs between the buffering member 28 and the magnetically attracted workpiece 12. Therefore, since it is difficult for the workpiece 12 to undergo sliding movement with respect to the buffering member 28, separation or falling off of the workpiece 12 from the magnet chuck 10 is effectively prevented. In this manner, simultaneously with the buffering action, the buffering member 28 also carries out a slip preventing action. Stated otherwise, the buffering member 28 functions as a slip preventing device.

Figure 5A:
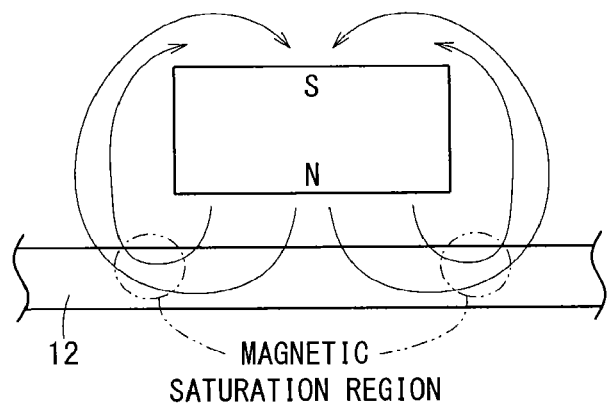
FIGS. 5A and 5B, respectively, are a schematic side view of a magnetic flux at a time that the number of poles is one on the workpiece magnetic attracting surface, and a schematic plan view showing a magnetic saturation region.
Figure 5B:
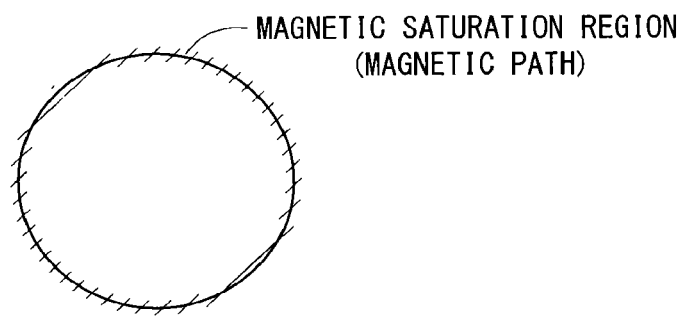

In FIGS. 5A and 5B, a magnetic flux that occurs in a conventional technique, in which the workpiece magnetic attracting surface is only one pole of an N-pole, and a region in which magnetic saturation occurs are shown schematically. In this case, the magnetic flux, which starts from the N-pole that constitutes the workpiece magnetic attracting surface, passes through the interior of the workpiece 12, and is directed toward the S-pole on the rear surface. The region in which magnetic saturation has occurred is of a substantially circular shape.

Figure 6A:
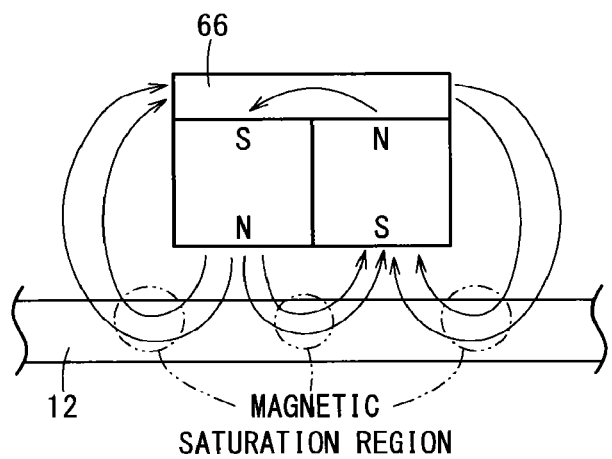
FIGS. 6A and 6B, respectively, are a schematic side view of a magnetic flux at a time that the number of poles is two (the combination of an N-pole and an S-pole is one pair) on the workpiece magnetic attracting surface, and a schematic plan view showing a magnetic saturation region.
Figure 6B:
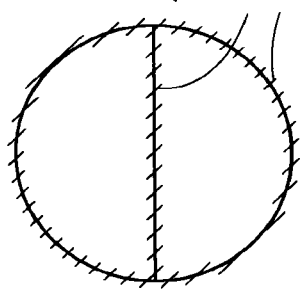

On the other hand, FIGS. 6A and 6B are schematic views showing a magnetic flux that occurs when a combination of an N-pole and an S-pole is formed as one pair on the workpiece magnetic attracting surface, and a region in which magnetic saturation occurs. With this configuration, the magnetic flux, which starts from the N-pole that constitutes a workpiece magnetic attracting surface, passes through the interior of the workpiece 12, and is directed toward an S-pole adjacent to the workpiece attracting surface, and an S-pole on the rear surface thereof. Further, the magnetic flux, which starts from the N-pole that is positioned on the rear surface of the workpiece magnetic attracting surface, passes through the interior of the workpiece 12, and is directed toward an S-pole of the workpiece attracting surface, together with passing through the interior of the yoke 64, and being directed to the S-pole on the rear surface of the workpiece magnetic attracting surface. Consequently, the magnetic saturation, together with being circular shaped, also occurs at a position along the diameter.

Figure 7:
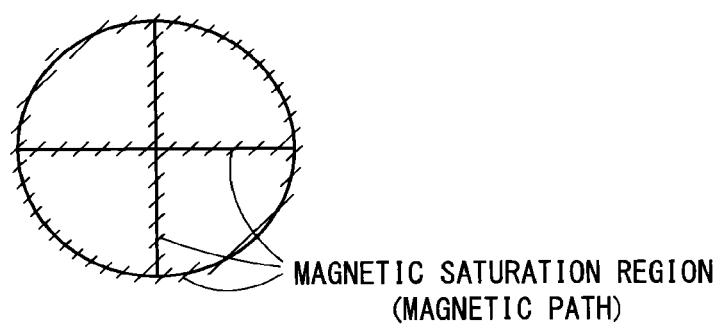
FIG. 7 is a schematic plan view showing a magnetic saturation region at a time that the number of poles is four (combinations of an N-pole and an S-pole are two pairs) on the workpiece magnetic attracting surface.

FIG. 7 is a schematic view showing a magnetic flux that occurs when a combination of an N-pole and an S-pole is formed as two pairs on the workpiece magnetic attracting surface, and a region in which magnetic saturation occurs. In this case, the magnetic saturation, together with being circular shaped, also occurs at positions along two diameters. Compared to the formerly mentioned configuration, when a combination of N-poles and S-poles is formed, it is understood that the amount of magnetic flux that passes through the interior of the workpiece 12 becomes greater.

Figure 8:
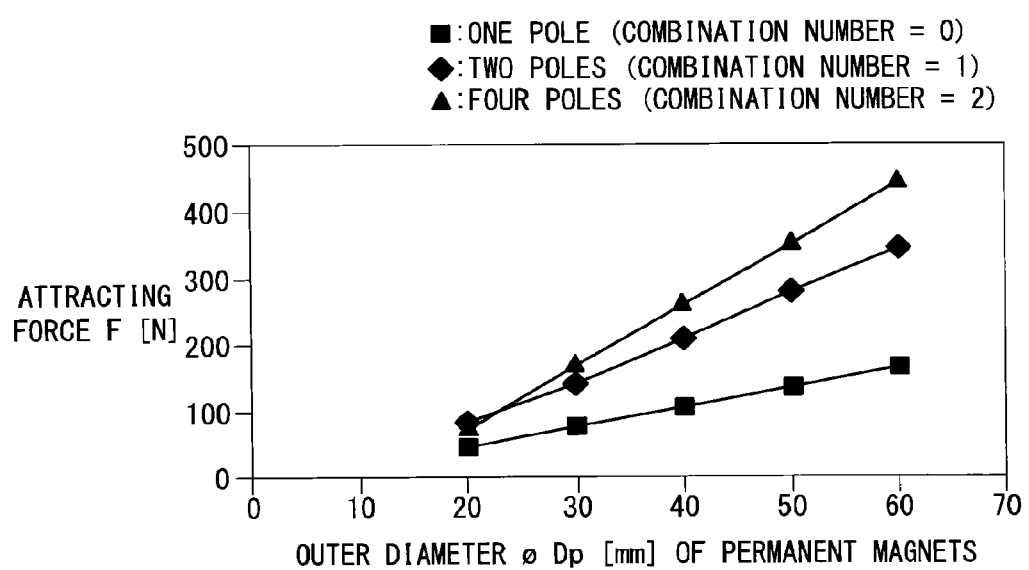
FIG. 8 is a graph showing a relationship between the number of magnetic poles (number of combinations of an N-pole and an S-pole) on the workpiece magnetic attracting surface, and the generated attracting force.

FIG. 8 is a graph showing a relationship between outer diameters of the permanent magnets and the attracting forces generated thereby, showing a magnet chuck in which a single permanent magnet is used and the workpiece magnetic attracting surface has one single N-pole formed thereon (■ (black square) plot), a magnet chuck in which two permanent magnets are used and the workpiece magnetic attracting surface has one N-pole and one S-pole, with a combination of an N-pole and an S-pole being formed as one pair thereon (♦ (black diamond) plot), and a magnet chuck 10 according to the present embodiment in which four permanent magnets of the first through fourth permanent magnets 56a through 56d are used, and the workpiece magnetic attracting surface includes a combination of N-poles and S-poles formed as two pairs thereon (▲ (black triangle) plot). It goes without saying that the materials and retaining forces of the permanent magnets in each of the magnet chucks, and the overall dimensions of the permanent magnets are mutually the same.

It also is understood from FIG. 8 that, as the number of magnetic poles on the workpiece magnetic attracting surface increases, the attracting force becomes greater. In particular, when the outer diameter of the permanent magnets overall exceeds 20 mm, or when the thickness of the workpiece 12 becomes small, the difference in the attracting force becomes pronounced. From this fact, it is made clear that by forming the combination of the N-poles and the S-poles on the workpiece magnetic attracting surface to be one pair or greater, and more preferably, two pairs or greater, a sufficient attracting force is expressed, such that even a workpiece 12 made from a thin steel plate and which is a heavy object can be attracted and retained. This is because, as has been described above, due to the combination of N-poles and S-poles being formed on the workpiece magnetic attracting surface, the amount of magnetic flux that passes through the interior of the workpiece 12 becomes greater.

As noted above, by the combination of N-poles and S-poles being formed on the workpiece magnetic attracting surface, the attracting force with respect to the workpiece 12 becomes greater. In particular, according to the present embodiment, the combination of N-poles and S-poles is formed in two pairs on the workpiece magnetic attracting surface, and therefore, a sufficient attracting force is expressed.

Consequently, according to the present embodiment, assuming that the materials and characteristics of permanent magnets are the same, when the outer diameters are the same, the attracting force with respect to the workpiece 12 can be increased. This implies that workpieces 12 of even greater weight can be attracted and retained.

Alternatively, if the attracting force is equivalent, the permanent magnets overall can be set to a smaller diameter. Stated otherwise, the magnet chuck 10 can be made compact in size and scale.

Figure 9A:
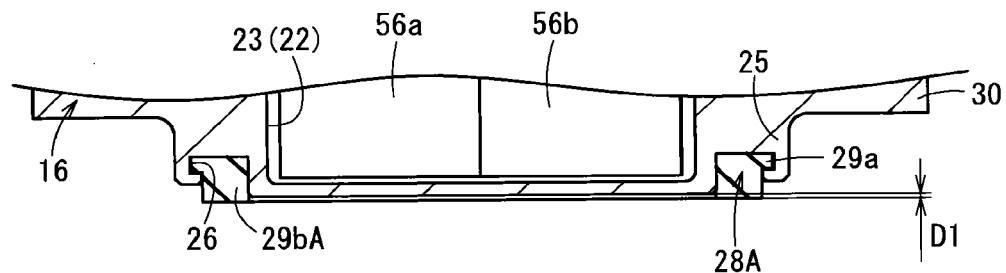
FIGS. 9A through 9C are cross-sectional views of essential components, showing conditions in which buffering members, amounts of projection of which from the magnet cover differ, are attached.
Figure 9B:
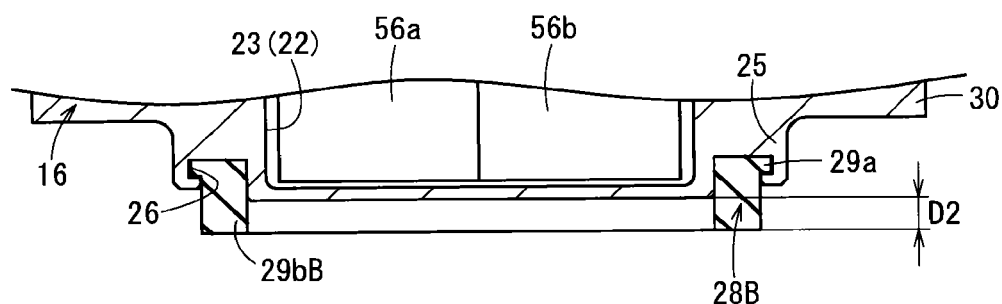
Figure 9C:
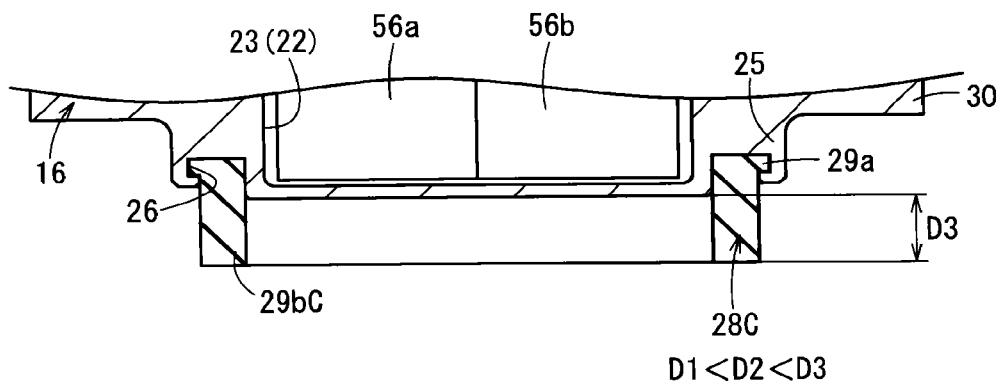

The attractive force with respect to the workpiece 12 can be adjusted as well by modifying the projecting amount D by which the cylindrical portion 29b that constitutes the buffering member 28 projects from the hollow cylindrical column 25 (magnet cover 16). Concerning this point, a description will be made with reference to FIGS. 9A through 9C and FIG. 10. To facilitate the description, the buffering members shown in each of FIGS. 9A through 9C are designated using the reference characters 28A, 28B, and 28C.

Each of the buffering members 28A, 28B, 28C includes cylindrical portions 29bA, 29bB, 29bC, respectively. In addition, as will be understood by contrasting differences between FIGS. 9A through 9C, the projecting amounts D1, D2, D3 by which the cylindrical portions 29bA, 29bB, 29bC project from the hollow cylindrical column 25 become greater in this order. More specifically, among the projecting amounts D1 to D3, the relationship D1<D2<D3 is satisfied.

As described above, the buffering members 28A through 28C interfere with the workpiece 12 when the workpiece 12 is magnetically attracted to the bottom wall of the magnet cover 16. Consequently, the distance between the workpiece 12 and the first through fourth permanent magnets 56a through 56d, which have arrived at the bottom dead center point, becomes greater in order of the buffering members 28A, 28B, and 28C. This is because, by abutment of the workpiece 12 respectively against the cylindrical portions 29bA, 29bB, 29bC that project from the hollow cylindrical column 25, the workpiece 12 coming into closer proximity to the first through fourth permanent magnets 56a through 56d beyond that amount is suppressed.

Figure 10:
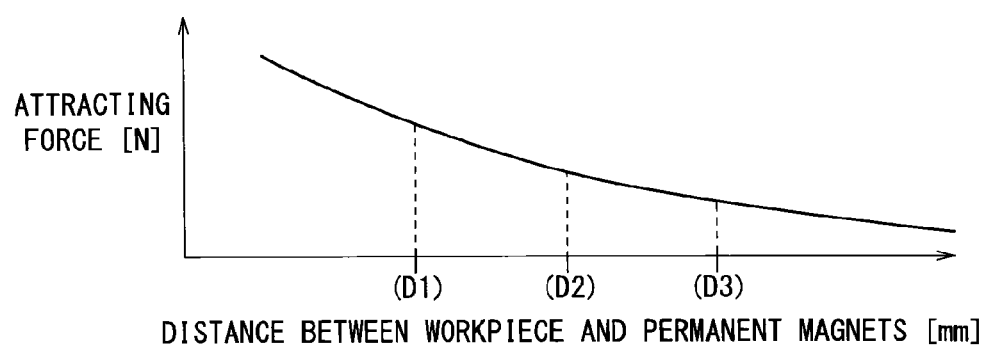
FIG. 10 is a graph showing a change in the attracting force with respect to the workpiece when the buffering members shown in FIGS. 9A through 9C are attached.

FIG. 10 is a graph showing a relationship of a spacing distance between the workpiece 12 and the first through fourth permanent magnets 56a through 56d, and a change in the attracting force with respect to the workpiece 12 by the first through fourth permanent magnets 56a through 56d. In FIG. 10, the spacing distances when the projecting amounts are D1, D2, or D3 are shown as D1, D2, D3 on the horizontal axis.

From FIG. 10, it can be understood that as the spacing distance increases, the attracting force becomes smaller. The reason therefor is that, as the spacing distance becomes greater, it becomes more difficult for the attracting force of the first through fourth permanent magnets 56a through 56d to be exerted on the workpiece 12.

From reasons such as those described above, the attracting force with respect to the workpiece 12 can suitably be adjusted by exchanging the buffering members 28 which differ in the projecting amounts D thereof. Consequently, for example, when the workpiece 12 is an object having a large weight, the attracting force can be increased, and it can be made more difficult for dropping off of the workpiece 12 during transport to occur. Conversely, when the workpiece 12 is a lightweight object, aside from avoiding dropping off of the workpiece 12, the attracting force may be made smaller to a degree that enables the workpiece 12 to be easily released from the magnetic attracting force of the first through fourth permanent magnets 56a through 56d after transport thereof.

More specifically, as the buffering member 28, a plurality of such members are prepared, which differ in the projecting amount D thereof from the hollow cylindrical column 25, and versatility is improved, for example, by exchanging the buffering member 28 appropriately to match with the lightweight or heavyweight nature, etc., of the workpiece 12 to be transported.

When plural buffering members 28 are used in the manner described above, the colors thereof may differ for each of such members that differ in the projecting amount D thereof. More specifically, in the aforementioned example, the buffering member 28A of the projecting amount D1, the buffering member 28B of the projecting amount D2, and the buffering member 28C of the projecting amount D3 preferably have different colors, respectively. Owing thereto, a buffering member 28 of a desired projecting amount can be quickly confirmed based on the color of the buffering member 28. Consequently, incorrect attachment of a buffering member 28 is avoided.

The member for easily identifying or confirming the buffering members 28 that differ in projecting amount D is not particularly limited to making the colors thereof different. For example, any suitable identifier such as markings or the like may be provided, to make the appearance of the respective buffering members 28 different from each other.

After the workpiece 12 has been attracted (magnetically attracted) as described above, by the robot carrying out predetermined operations, the distal end arm and the magnet chuck 10 are moved to suitable positions. Along therewith, the workpiece 12 also is moved.

Next, under the action of the supply and exhaust mechanism, the pressurized air is exhausted from the upper chamber 62 through the second port 50. Simultaneously, pressurized air is supplied from the supply and exhaust mechanism through the first port 37 to the lower chamber 23. A portion of the pressurized air enters into the first intermediate chamber 24 from between the flange 66 and the side wall of the first sliding hole 22, and furthermore, passes through the communication groove 85 and enters into the second intermediate chamber 60. Accordingly, together with the flange 66 of the yoke 64 receiving pressing from the compressed air inside the lower chamber 23, the piston 58 also receives pressing from the compressed air inside the first intermediate chamber 24. Coupled with the upper chamber 62 being placed at a negative pressure, the piston 58 is displaced (rises) in a direction to separate away from the plate member 42.

According to the present embodiment, the third seal member 90 is disposed on the side wall of the piston 58. More specifically, a seal member is not disposed between the yoke 64 and the inner wall of the second intermediate chamber 60. Therefore, in the aforementioned process, the member that receives the pressing force of the pressurized air supplied to the upper chamber 62, and the pressing force of the gas that has moved into the second intermediate chamber 60, in either of such cases, is the piston 58. In addition, although a region that is covered by the shaft 68 exists on the lower end surface of the piston 58, the flange 66 also receives pressing from the compressed air. More specifically, the pressure receiving area when the piston 58 descends, and the pressure receiving area when the piston 58 is raised are substantially the same. Consequently, a decrease in the thrust needed to elevate the piston can be avoided.

In following relation to the piston 58 being raised, the yoke 64 and the first through fourth permanent magnets 56a through 56d are raised integrally therewith. More specifically, the first through fourth permanent magnets 56a through 56d are separated physically from the workpiece 12, and as a result, the magnetic forces of the first through fourth permanent magnets 56a through 56d are not exerted on the workpiece 12. Consequently, the workpiece 12 is released from the constraint by the magnetic force of the first through fourth permanent magnets 56a through 56d.

The piston 58, the yoke 64, and the first through fourth permanent magnets 56a through 56d ultimately arrive at the top dead center point. In other words, the condition shown in FIG. 3 is restored.

When the piston 58 reaches the top dead center point, the disk-shaped projection 80 of the plate member 42 enters into the annular recess 72 formed in the flange 66 of the yoke 64. Further, the second damper 94 provided on the piston 58 abuts against the entry member 44 of the head cover 18. Vibrations or collisions that occur at the time of abutment are buffered by the second damper 94, and therefore, vibrating of the magnet chuck 10 can sufficiently be suppressed. Further, since damage to the piston 58 or the head cover 18 is avoided, durability of the magnet chuck 10 can be improved.

Further, during progression of the aforementioned process, rotation of the first through fourth permanent magnets 56a through 56d is prevented. This is because, as noted above, the first through fourth tie rods 54a through 54d are arranged in the vicinity of the first through fourth permanent magnets 56a through 56d. Since rotation of the first through fourth permanent magnets 56a through 56d is restricted in this manner, for example, a change in the magnetic flux density in the vicinity of the auto switch is avoided. Consequently, the occurrence of mistaken operations of the auto switch caused by such a change in the magnetic flux density can also be avoided.

The first through fourth tie rods 54a to 54d serve as members that tightly fasten the head cover 18, the cylinder tube 14, and the magnet cover 16 all together, and form the housing 20. More specifically, because rotation of the first through fourth permanent magnets 56a through 56d is prevented, there is no need for other members to be used separately therefrom. Accordingly, an increase in the number of parts is avoided, together with making the magnet chuck 10 more compact, while in addition being advantageous in terms of cost.

The present invention is not particularly limited to the embodiment described above, and various modifications can be adopted without deviating from the essence and scope of the present invention.

Figure 11:
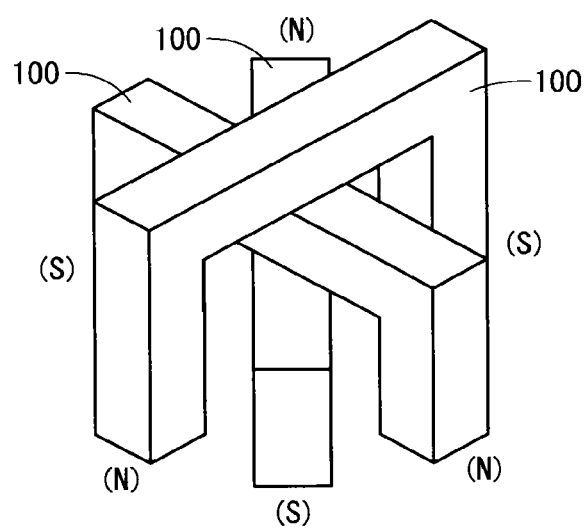
FIG. 11 is an outline perspective view showing a condition in which a workpiece magnetic attracting surface is formed by an assembly of three U-shaped permanent magnets.
Figure 12:
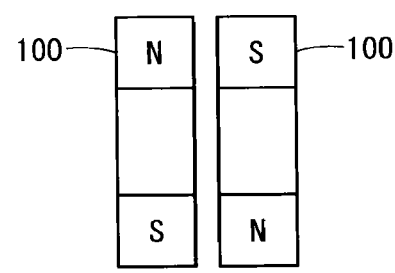
FIG. 12 is an outline bottom view showing a condition in which a workpiece magnetic attracting surface is formed by an assembly of two U-shaped permanent magnets.

For example, as shown in FIG. 11, two or more U-shaped permanent magnets 100 may be combined (three are shown in FIG. 11), and two or more of the N-poles and two or more of the S-poles may reside on the workpiece magnetic attracting surface. Apart from such a combination, the U-shaped permanent magnets 100 (two are shown in FIG. 12) can be combined such that magnetic pole faces thereof are arrayed as shown in FIG. 12, as viewed from below in plan.

Figure 13:
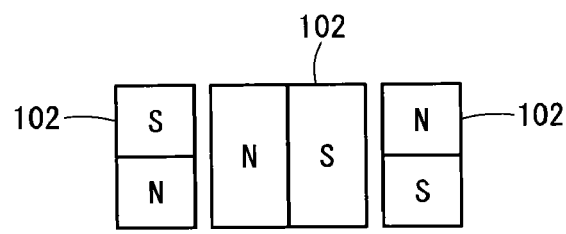
FIG. 13 is an outline front view showing a condition in which a Halbach array is formed with rod-shaped magnets, and a combination of a set of N-poles and S-poles is disposed on the workpiece magnetic attracting surface.

Further, as shown in FIG. 13, a combination of three or more rod-shaped magnets 102 (in FIG. 13, three are shown)

can be formed in a so-called Halbach array, and a combination of a set of N-poles and S-poles can be disposed on the workpiece attracting surface.

Although in the embodiment described above, a plurality of permanent magnets are used, a single permanent magnet can be used, which is manufactured by being magnetized such that an arrangement of N-poles and S-poles exists in two or more pairs on the workpiece magnetic attracting surface.

Figure 14:
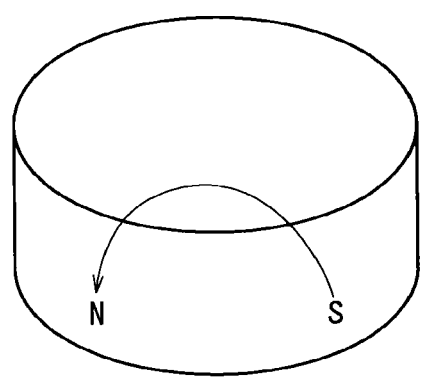
FIG. 14 is an outline overall perspective view of a permanent magnet obtained by magnetizing a cylindrical body, such that the direction of magnetic poles therein is in a U-shape.

As an example of such a permanent magnet, as shown in FIG. 14, magnetization with respect to a predetermined object such as a cylindrical body 98 is performed, so that the orientation of the magnetic poles becomes formed in a U-shape. Such a permanent magnet can be manufactured by bringing a U-shaped magnet in close proximity to one bottom surface of the cylindrical body 98, and thereby forming an N-pole and an S-pole on the bottom surface. More specifically, the one bottom surface becomes the workpiece magnetic attracting surface, whereas magnetic poles are not formed in the remainder of the other bottom surface.

Figure 15:
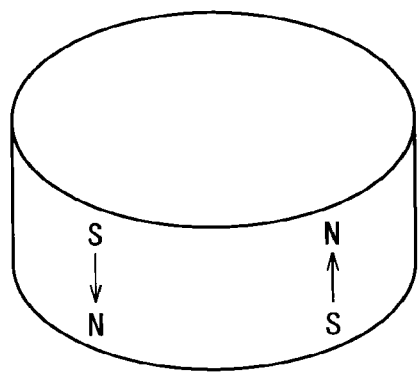
FIG. 15 is an outline overall perspective view of a permanent magnet obtained by magnetizing a cylindrical body, such that magnetic poles therein are oriented in a direction perpendicular to the workpiece magnetic attracting surface.

Moreover, aside from bringing a U-shaped permanent magnet in close proximity to one bottom surface of the cylindrical body 98 or the like, by bringing another U-shaped permanent magnet into close proximity to the other bottom surface, as shown in FIG. 15, a permanent magnet is manufactured in which an N-pole and an S-pole are formed on one bottom surface that serves as the workpiece magnetic attracting surface, and an S-pole and an N-pole are formed on the rear surface therefrom. More specifically, in this case, magnetism is carried out such that the magnetic poles are directed perpendicularly with respect to the workpiece attracting surface.

Further still, the first damper 84 may be disposed on the lower end surface of the piston 58. On the other hand, the second damper 94 may be disposed on the lower end surface of the entry member 44 of the head cover 18.

In addition, either one of the first damper 84 or the second damper 94 may be omitted.

Figure 16:
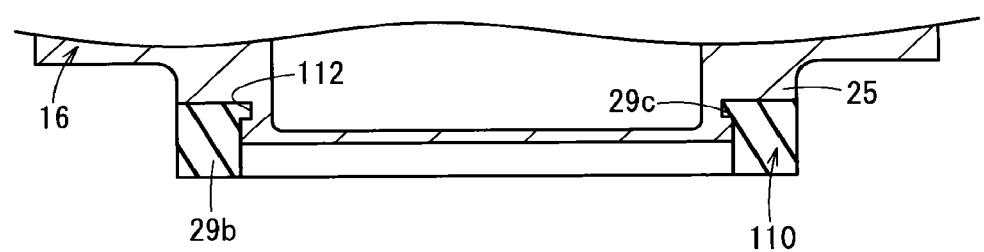
FIG. 16 is an outline cross-sectional view of essential components showing attachment of a differently shaped buffering member.

Furthermore, the buffering member is not limited particularly to the aforementioned buffering members 28, and 28A through 28C. For example, as shown in FIG. 16, a buffering member 110 may be provided, which includes a flange 29c that projects in a diametrical inward direction. In this case, on the hollow cylindrical column 25, a first annular groove 112 is formed that is recessed in a diametrical inward direction, and the flange 29c may be press-fitted into the first annular groove 112.

Figure 17:
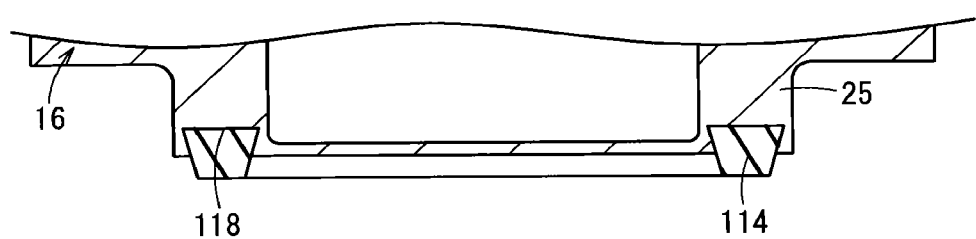
FIG. 17 is an outline cross-sectional view of essential components showing attachment of another differently shaped buffering member.
Figure 18:
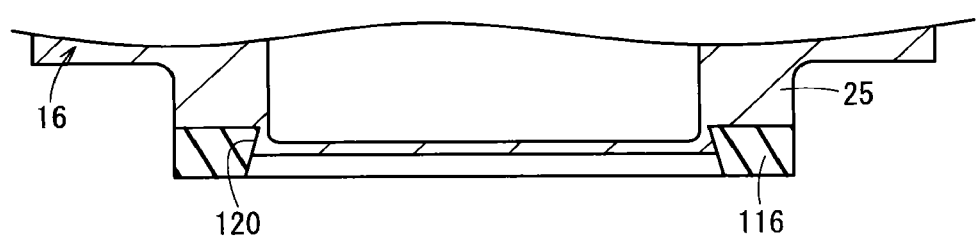
FIG. 18 is an outline cross-sectional view of essential components showing attachment of yet another differently shaped buffering member.

Further, as shown in FIGS. 17 and 18, a buffering member 114 or a buffering member 116 can be used, the cross section of which in the thickness direction is formed with a tapered shape. In this case, a first annular groove 118 or a first annular groove 120 may be formed on the end surface of the hollow cylindrical column 25 (see FIG. 17), or alternatively, may be formed on the side wall (see FIG. 18). In either of such cases, due to the tapered shapes, the buffering members 114, 116 are prevented from being pulled out from the first annular grooves 118, 120.

Figure 19:
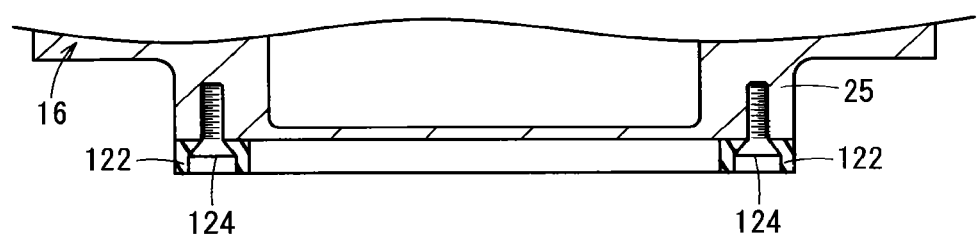
FIG. 19 is an outline cross-sectional view of essential components showing attachment of still another differently shaped buffering member.

The attachment with respect to the magnet cover 16 also is not particularly limited to press-fitting of the flange 29a into the first annular groove 26 or the like. More specifically, as shown in FIG. 19, a buffering member 122 may be attached to the magnet cover 16 by screws 124. In this case, the buffering member 122 need not necessarily be formed in a ring shape, and a plurality of arc-shaped buffering members 122 can be attached.

What is claimed is:

1. A magnet chuck that attracts and retains a workpiece with a workpiece magnetic attracting surface that faces toward the workpiece, by magnetic forces of a plurality of permanent magnets, the magnet chuck comprising:
   a piston accommodated inside a cylinder tube; and
   a rotation prevention member configured to prevent rotation of the permanent magnets, disposed in the cylinder tube, and wherein:
   the plurality of permanent magnets are configured to be displaced in a same direction as a direction of displacement of the piston, in following relation to the piston receiving a pressing force from a pressure fluid and being displaced thereby;
   the plurality of permanent magnets are arranged to cause a combination of an N-pole and an S-pole to exist in one or more pairs, on the workpiece magnetic attracting surface; and
   the rotation prevention member is made from a ferromagnetic material and is stationary.

2. The magnet chuck according to claim 1, wherein each of the plurality of permanent magnets is configured to be magnetized in a direction perpendicular with respect to the workpiece magnetic attracting surface.

3. The magnet chuck according to claim 2, wherein the N-pole and the S-pole reside as one pole each on the workpiece magnetic attracting surface.

4. The magnet chuck according to claim 2, wherein the N-pole and the S-pole reside as two poles each on the workpiece magnetic attracting surface.

5. The magnet chuck according to claim 2, wherein the permanent magnets are supported on the piston through a yoke.

6. The magnet chuck according to claim 1, comprising at least three permanent magnets disposed in a Halbach array including two permanent magnets magnetized in a direction perpendicular to the workpiece magnetic attracting surface, wherein an N-pole of one from among the two permanent magnets, and an S-pole of a remaining one of the two permanent magnets are configured to be exposed on the workpiece magnetic attracting surface.

7. The magnet chuck according to claim 1, wherein the permanent magnets are constituted from U-shaped magnets, an N-pole and an S-pole of each of the U-shaped magnets configured to be exposed on the workpiece magnetic attracting surface.

8. The magnet chuck according to claim 1, wherein the rotation prevention member is disposed at a boundary between the N-pole and the S-pole adjacent to each other on the workpiece magnetic attracting surface.

9. The magnet chuck according to claim 1, wherein the rotation prevention member is a connecting member configured to connect the cylinder tube and at least one other component.

10. The magnet chuck according to claim 1, wherein a seal member is disposed on a side wall of the piston, and a site between the piston and the cylinder tube is configured to be sealed by the seal member.

11. The magnet chuck according to claim 1, further comprising a magnet cover attached to the cylinder tube and configured to cover the permanent magnets,
   wherein a buffering member, which is configured to carry out a buffering action when the permanent magnets attract the workpiece, is mounted detachably on the magnet cover.

12. The magnet chuck according to claim 11, wherein an attractive force with respect to the workpiece is configured to be changed accompanying the buffering member being exchanged with another buffering member whose projecting thickness from the magnet cover is different.

13. The magnet chuck according to claim 9, wherein the at least one other component is a head cover.

* * * * *